United States Patent [19]

Sims

[11] Patent Number: 5,255,787
[45] Date of Patent: Oct. 26, 1993

[54] LEAD SHOT RECLAMATION DEVICE AND METHOD

[76] Inventor: John Sims, 710 Crescent Blvd., Glen Ellyn, Ill. 60137

[21] Appl. No.: 695,150

[22] Filed: May 3, 1991

[51] Int. Cl.⁵ ............................................. B03B 7/00
[52] U.S. Cl. ........................................ 209/17; 209/44; 209/158; 209/160; 209/208; 209/506
[58] Field of Search ............... 209/17, 155, 158, 159, 209/208, 209, 454, 506, 460, 160, 161, 44, 12

[56] References Cited

U.S. PATENT DOCUMENTS

| | | | |
|---|---|---|---|
| 665,835 | 1/1901 | Miller | 209/17 |
| 1,311,517 | 7/1919 | Hitchcock | 209/160 X |
| 1,334,765 | 3/1920 | Lioud | 209/454 X |
| 1,438,537 | 12/1922 | Lioud | 209/454 X |
| 1,449,603 | 3/1923 | Hokanson | 209/160 |
| 1,477,955 | 12/1923 | Henry | 209/158 X |
| 1,696,767 | 12/1928 | Hoyois | 209/158 X |
| 2,922,521 | 1/1960 | Schranz | |
| 2,931,501 | 4/1960 | Wahlroos et al. | 209/160 |
| 2,966,262 | 12/1960 | Hobart | 209/454 X |
| 3,722,678 | 3/1973 | Potter | 209/156 |
| 4,199,441 | 4/1980 | Ross | 209/44 |
| 4,253,943 | 3/1981 | Thrasher | |
| 4,378,290 | 3/1983 | Kennedy, Jr. | 209/17 X |
| 4,715,949 | 12/1987 | Watts | |

FOREIGN PATENT DOCUMENTS

| | | | |
|---|---|---|---|
| 235994 | 2/1910 | Fed. Rep. of Germany | 209/158 |
| 22655 | of 1912 | United Kingdom | 209/158 |

*Primary Examiner*—Donald T. Hajec
*Attorney, Agent, or Firm*—Jenner & Block

[57] ABSTRACT

A lead shot recovery device is disclosed for reclaiming lead shot from a slurry of material taken from lake bottoms. In one embodiment, the device includes a sluice box having an open bottom riffle bed through which can pass a net upward liquid flow. The cooperative action of the upflow and the riffles causes lead shot to fall through the riffle bed and into a collection pit from which the lead shot can be continuously removed. A method for recovering lead shot using the recovery device is also disclosed.

8 Claims, 3 Drawing Sheets

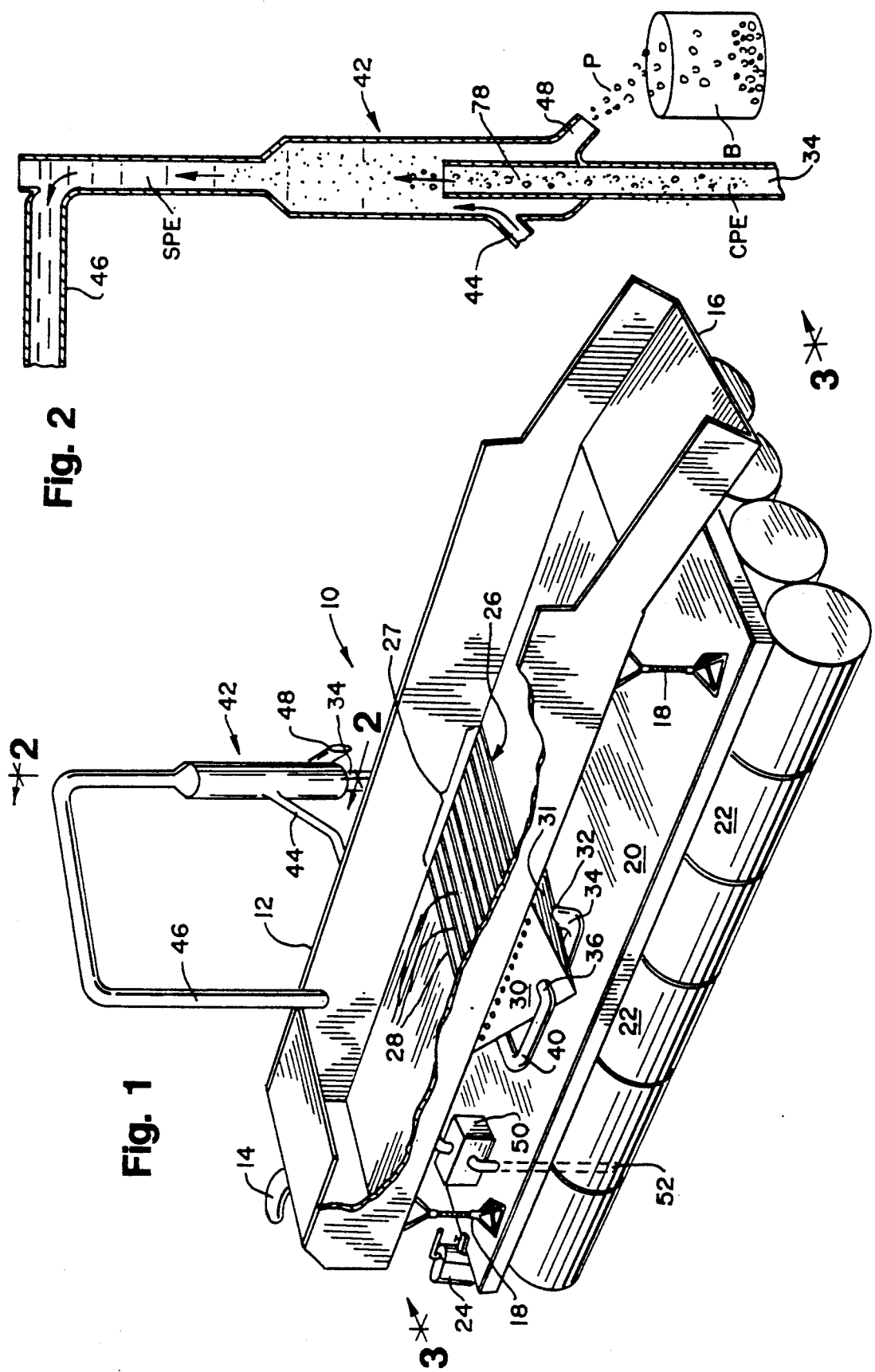

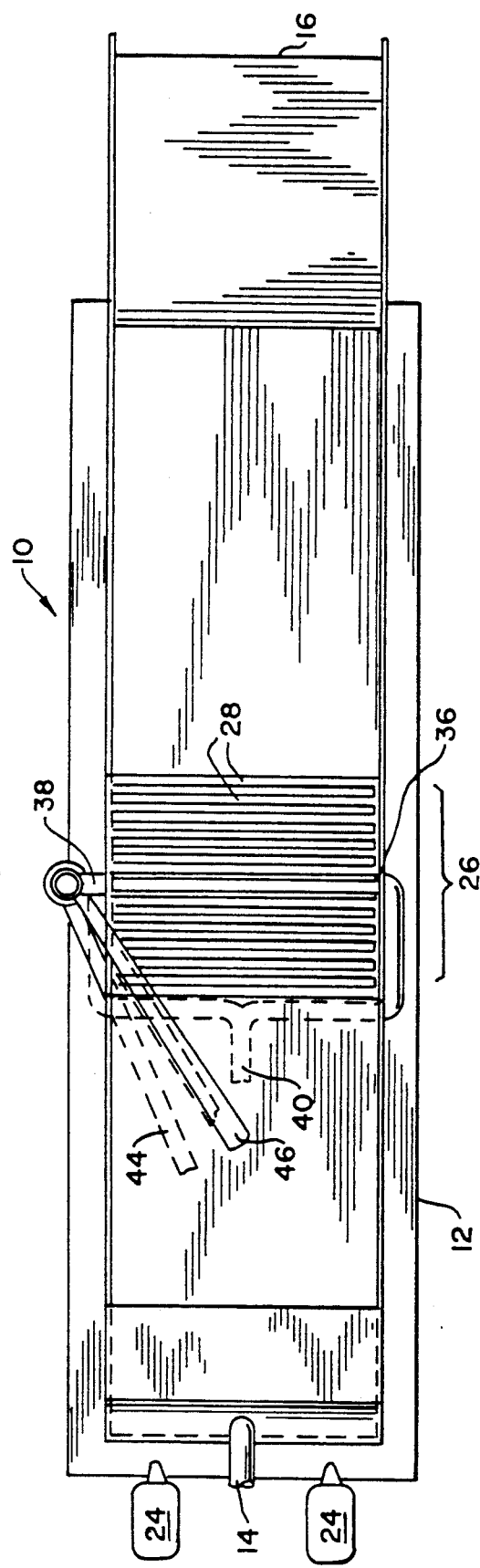
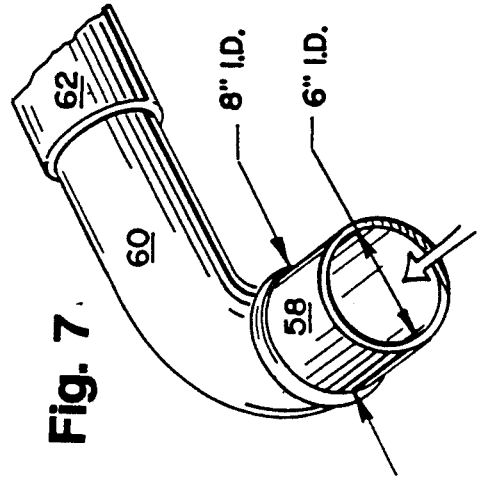
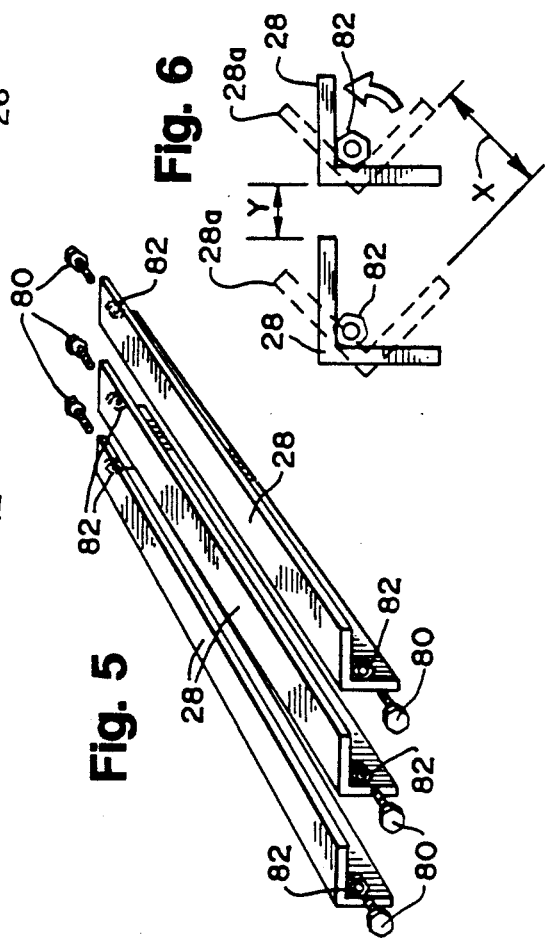

5,255,787

LEAD SHOT RECLAMATION DEVICE AND METHOD

FIELD OF THE INVENTION

The invention relates to a device for recovering heavy metal pellets from a slurry. More particularly, the invention relates to a device for reclaiming lead shot from a slurry of lead shot-bearing material, such as that which may be dredged from a lake bottom containing lead shot.

BACKGROUND OF THE INVENTION

Increasing concern over the quality of the environment has led to progressively stricter standards concerning environmental contaminants. The contamination of aquatic ecosystems has received particular attention from state and local governments as well as conservationists and sportsmen. One aquatic contaminant receiving particular attention from regulators and the public is lead shot from shotgun shells.

Lead shot contamination of aquatic ecosystems typically occurs where sportsmen fire shotguns over a body of water. The highest concentration of lead shot can be found in the waters offshore from gun clubs or other firing ranges. At these locations, clay targets are typically launched for trap or skeet shooting in a trajectory that causes lead shot fired at the targets to fall into a lake or other body of water. Because access to the waters offshore from the club usually is limited, this arrangement minimizes the chance for injury from lead shot fired at the clay targets.

Unfortunately, continued target shooting over a lake leads to a significant accumulation of lead shot on the bottom of the lake. Because the lead is relatively heavy, the lead shot becomes embedded in and mixed with the mud, silt, clay target material and other debris found on the bottom of the lake. As time goes on, the amount of lead on the bottom of the lake steadily increases until a significant concentration of lead shot is embedded in the lake bottom.

The accumulation of lead shot in the lake bottom can pose a significant environmental hazard. Lead, a heavy metal, is know to be a serious aquatic contaminant posing health hazards to humans and animals even when present at low levels.

The accumulation of lead shot also represents an unrealized economic resource. When the accumulation of shot is great enough, the contaminated bottoms might be more efficiently mined than other sources of lead found in nature, if a suitable recovery device existed. Reclamation of the lead shot from the lake bottom could, therefore, reduce environmental stress associated with other lead mining operations that are needed without the lead shot recovery.

While various mineral recovery devices are known in the art for recovering items such as gold particles, nuggets or flakes from a slurry of feed material, these devices typically are not designed to recover uniformly sized particles. Furthermore, most recovery devices known in the art cannot operate continuously, but instead must be shut down periodically to empty the recovered material from the device. These periodic shutdowns slow operations and can increase cost to the point where a lead shot recovery operation would be economically unfeasible.

Accordingly, a need exists for a device that can continuously recover lead shot or other generally uniform sized spherical pellets from a slurry of dredged feed material, thereby enhancing environmental quality and enabling the recycling of the lead so recovered.

SUMMARY OF THE INVENTION

In accordance with the present invention, a lead shot recovery device is disclosed for reclaiming lead shot, especially where lead shot is located at the bottom of a lake or other body of water or from a water slurry of lead shot-containing feed materials. While the device is particularly suited for recovering lead shot, it can also be used to recover other similarly sized, generally spherical objects of high specific gravity from a flowing slurry of feed material. As used herein, "slurry" means a mixture of liquid, typically water, and undissolved solid materials including the high specific gravity material to be recovered (e.g., lead pellets) and typically unwanted solids having a lower specific gravity than the pellets, such as rock, soil and other solids. For purposes of the following descriptions, both lead shot and other generally spherical, solid objects of generally uniform size and high specific gravity are referred to generically as "pellets." The pellets or other solid particles to be recovered will typically have a high specific gravity substantially greater than water and as used herein, high specific gravity is at least about five or more.

In accordance with one aspect of the invention, a lead reclamation device is provided which can reclaim lead shot contained in sediment and other material that can be dredged from the bottom of a body of water or from a lead shot-containing slurry of feed material.

In accordance with another aspect of the invention, a reclamation device is provided which can reclaim high specific gravity, generally uniformly sized pellets from a slurry of feed stock so that the pellets can be recycled or otherwise collected.

In accordance with still another aspect of the invention, a lead shot recovery system is provided which can continuously remove lead shot from a continuous flow of shot containing feed slurry, thereby permitting the continuous dredging of a body of water without requiring repeated work stoppages to remove recovered lead shot from the reclamation device.

More specifically, in one embodiment of the invention, a device is provided that is particularly suited for the recovery of high specific gravity pellets, especially lead pellets or shot, from a water slurry containing the pellets and other unwanted lower specific gravity undissolved solids. The device includes apparatus for continuously receiving, separating, transporting and discharging a slurry of feed materials. Separation apparatus is provided which causes the desired pellets to be selectively recovered from the feed slurry by separating the feed slurry into a collected portion rich in the high specific gravity pellets and a pellet depleted discard portion of the feed slurry. Collection and discharge apparatus is provided for collecting and discharging the recovered pellets from the collected pellet rich portion. In some embodiments, a secondary separator apparatus is provided for removing any residual undesired solid feed material from the collected pellet rich portion.

In another embodiment of the recovery device, a sluice box is provided for having an inlet and an outlet for permitting slurry flow therethrough. An open bottom riffle bed, composed of a plurality of spaced apart riffles, is located in a bottom portion of the sluice box between the inlet and outlet and over a collection pit. Separate fluid flow into the collection pit and below the riffle bed controls the fluid flow between the sluice bed and collection pit, and preferably provides a slight upflow through the riffle bed from the collection pit, helping to create eddy currents at the riffle bed and an apparent or false bottom as well as providing a self-cleaning effect for the riffles. In order to create the eddy currents and apparent or "false" bottom in the open bottom riffle bed which facilitates separation of high specific gravity material from lower specific gravity material, the net flow of fluid through the riffle bed should be either zero or a slight upward or downward flow (for example, such as about 0 to 20 gallons per minute per square foot of riffle bed). Preferably, for optimum separation of lead shot, there will be a slight upflow from the collection pit through the riffle bed and into the sluice box. An upflow through the riffle bed of about 20 gallons per minute per square foot of riffle bed has been found to be particularly effective for the separation of lead shot for the apparatus described in the Detailed Description at a slurry flow rate of about 1,800-3,000 gallons per minute. Greater upflows could also be used. Slight downflows through the riffle bed can cause problems if the slurry contains particles larger than the riffle spacing, since these particles can collect on and obstruct flow through and separation by the riffle bed; and in any event, fluid downflow through the riffle bed results in a greater accumulation of unwanted solids passing through the riffle bed and into the collection pit. Thus, by having a positive upward liquid flow through the riffle bed, the riffle bed is self-cleaning. A water supply line is connected to the collection pit for controlling the fluid flow through the riffle bed and preferably for providing a net upward fluid flow through the riffles out of the collection pit. Limiting fluid flow down through the riffle bed and in particular providing a slight upward flow from the collection pit and up through the riffles provides an apparent or "false" bottom for the riffle bed. This also helps cause eddy currents adjacent the riffles which facilitate the downward removal of the pellets between the riffles and into the collection pit from the feed slurry, while the less dense solid particles pass over the riffles and are discharged from the outlet of the sluice box. In some embodiments, the riffles are L-shaped and the degree of pitch can be adjusted about their longitudinal axis. The riffles can be conveniently made of angle iron, for example. The collection pit bottom effluent contains the separated pellets which can then be dewatered or processed further to remove any remaining undesired solids. For example, in other embodiments, a secondary separator is provided for removing residual undesired solid feed slurry components that passed through the riffle bed and into the collection pit bottom effluent.

In yet another embodiment of the recovery device, a sluice box is provided for receiving, transporting, separating and discharging a slurry of feed materials. The sluice box includes a riffle bed composed of a plurality of spaced apart L-shaped riffles which are located in a bottom portion of the sluice box. The riffle bed is oriented to permit flow of a slurry of feed stock introduced into the sluice box upstream of the riffle bed in a direction over and generally perpendicular to the top surface of the riffle bed and riffles. The riffle bed has an open bottom. Located beneath the riffle bed is a collection pit preferably having a pair of downwardly converging inclined walls. The collection pit accumulates the relatively high specific gravity material collected by the riffle bed, which usually will be lead pellets or similar material. A pair of generally opposed water supply lines are provided in the collection pit for limiting downward flow through the riffle bed or for providing a net upward flow of water through the riffle bed, which create an apparent or a "false bottom" at the lower portion of the riffles, thereby inducing eddy currents thereat as previously described. A collection pit discharge pump can be provided to continuously discharge material from the collection pit into a secondary separator, which removes undesired solid feed material that passed through the riffle bed from the collection pit effluent and discharges the recovered pellets from a pellet outlet port. In other embodiments, the riffles of the riffle bed can be adjusted to optimize the separation of recovered materials from the feed slurry.

In another embodiment, the recovery device is mounted on floating watercraft, such as a barge, for example, to permit the recovery device to maneuver about a body of water to continuously dredge and process pellet containing sediment from the bottom of the body of water.

In accordance with another aspect of the invention, a method is provided for reclaiming high specific gravity pellets from a feed slurry. The method includes the steps of passing a slurry of feed materials through a sluice box and over a riffle bed composed of a plurality of riffles and an open bottom, controlling flow through the riffle bed to provide an apparent or false bottom to permit eddy currents in and around the riffle bed, preferably by providing a net upward flow of fluid through the riffle bed, and continuously collecting the high specific gravity pellets falling through the riffles from the slurry. Flow control is accomplished as previously described, by sufficiently limiting or preventing downward flow through the riffle bed and preferably by providing a slight net upward flow of water through the riffle bed.

BRIEF DESCRIPTION OF THE DRAWINGS

FIG. 1 is a perspective view of a lead shot reclamation device in which a portion of a sluice box side wall has been cut away to better illustrate the riffle bed;

FIG. 2 is a cross-sectional view of the secondary separator taken along line 2—2 of FIG. 1;

FIG. 4 is a plan view of the reclamation device of FIG. 1;

FIG. 5 is an exploded perspective view of a portion of the riffle bed;

FIG. 6 is a cross-sectional view of a portion of the riffle bed showing how individual riffles can be adjusted; and FIG. 7 is a perspective view of a fitting useful in the collection of feed material from the bottom of a body of water.

DETAILED DESCRIPTION OF THE INVENTION

Figure 3:
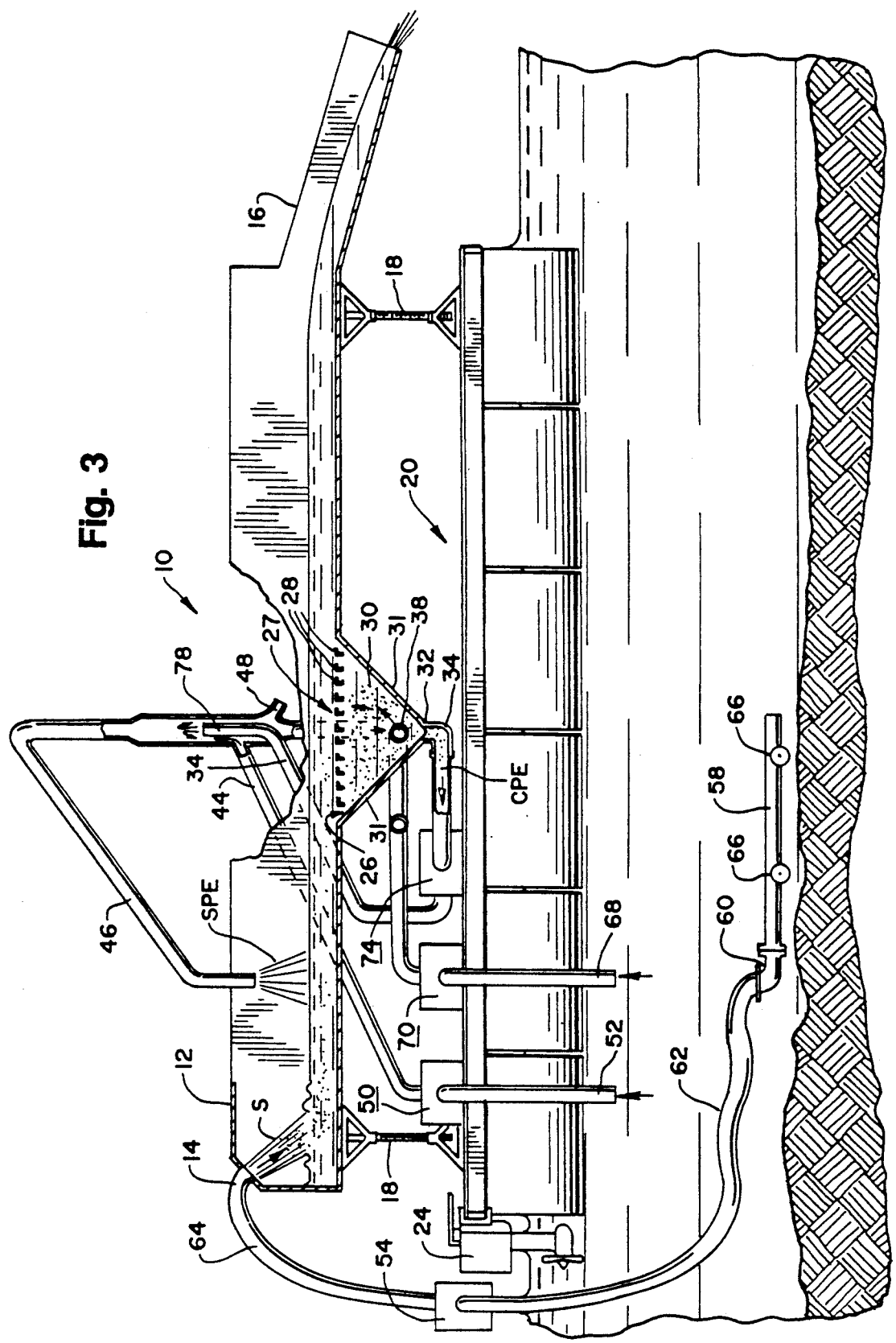
FIG. 3 is a cross-sectional elevation view of the reclamation device of FIG.1 taken along line 3—3 of FIG. 1.

One embodiment in accordance with the invention of a reclamation device especially suitable for removing lead a slurry of feed material is shown in FIGS. 1-7. Throughout these figures, like numbers refer to like parts. Although the illustrated embodiment is particularly adapted for the removal of lead shot from a water slurry feed, typically gathered from the bottom of a body of water, the reclamation device can remove other high specific gravity generally spherical pellets of generally uniform size from a slurry containing the pellets.

Referring to the FIGURES generally, and in particular to FIGS. 1 and 3 the general arrangement of components in lead shot reclamation device 10 is illustrated. A sluice box 12 has an inlet 14 for receiving a feed slurry S (shown in FIG. 3), usually obtained by a dredging or similar operation, and an outlet end 16 for discharging processed feed. Sluice box 12 preferably is constructed from aluminum because aluminum is relatively light in weight and is a corrosion resistant material. Sluice box 12 can be supported by any convenient structure, which in the illustrated embodiment are jack stands 18. Sluice box 12 is located on a barge 20 fitted with pontoons 22. Barge 20 includes motors 24 for driving and otherwise positioning barge 20 during lead shot reclamation operations.

Sluice box 12 includes a generally open central bottom portion 26 fitted with a riffle bed 27 that consists of a plurality of riffles 28. Riffles 28 are oriented perpendicular to the flow of the feed slurry through sluice box 12 and cause the separation of the high specific gravity material including the lead shot from the feed slurry as hereinafter described. A collection pit 30 located below riffles 28 collects removed lead shot. Collection pit 30 includes a pair of downwardly converging collection pit walls 31 which guide collected material, including the separated lead shot, toward a discharge port 32 located near the bottom of pit 30. Port 32 is connected to a collection pit effluent line 34 for removing collection pit effluent (CPE in FIG. 3) including the recovered lead shot for further processing.

Collection pit 30 also includes a pair of generally opposed clean water inlet ports 36 and 38 located on opposite sides of pit 30 inlet ports 36 (shown in FIGS. 1 and 4) and 38 (shown in FIGS. 3 and FIG. 4) are connected to a collection pit clean water supply line 40. Supply line 40 provides a source of clean water, such as from a lake or other source of relatively clean water, to pit 30 as described later in connection with FIG. 3.

Also shown in FIGS. 1 and 2 is a secondary separator 42. Secondary separator 42 is used to remove undesired residual solid material from the water and lead shot contained in the collection pir effluent. Collection pit effluent (CPE in FIGS. 2 and 3) is introduced into secondary separator 42 through collection pit effluent line 34, while clean water is supplied to secondary separator 42 through secondary separator clean water supply line 44. Secondary separator effluent (SPE) exiting the top of secondary separator 42 is introduced into sluice box 12 through cleaning tower effluent line 46 and reclaimed lead shot P is discharged from secondary separator 42 through lead shot discharge port 48. Other components shown in FIG. 1 include a secondary separator clean water pump 50 and its clean water suction line 52. Line 52 is located between pontoons 22 beneath barge 20 so that it does not interfere with dredging operations.

The operation of lead shot reclamation device 10 is best described with respect to FIGS. 1-3. Reclamation operations typically involve the use of a commercially available dredge for providing a continuous feed slurry S of lake bottoms for processing in device 10. In FIG. 3, the dredge is indicated symbolically by a box 54. A suitable dredge 54 is the model "Nessie" dredge available from Keene Engineering Company of North Ridge, Calif.

Dredge 54 includes a suitable dredge pump (not shown) for suctioning lake bottom material and water that composes slurry S into rigid bottoms inlet pipe 58 through elbow 60 and a flexible suction line 62. The dredge pump then pumps the feed slurry through dredge effluent line 64 into inlet 14 of sluice box 12. Rigid bottoms inlet pipe 58 includes wheels 66 to allow pipe 58 to move freely over the lake bottom as dredge 54 maneuvers pipe 58 over the lake bottom. Preferably, rigid pipe is a 6-inch diameter line about 7 feet in length, although pipe 58 can be longer, for example, 15-20 feet in length, if constructed of steel or up to 30 feet in length if constructed of stainless steel. The length of pipe 58 is limited by the maximum weight that can be maneuvered by dredge 54. For example, with the "Nessie" dredge, the maximum weight is about 550 pounds.

Elbow 60 reduces 8 inch suction line 62 to a six inch flange for connecting pipe 58 as shown in FIG. 7. The use of reducing elbow 60 ensures that objects passing through 6-inch pipe 58 will be easily suctioned through the larger 8 inch flexible line 62. In order to effectively suction lead pellets through line 62, the velocity of the slurry needs to be sufficient to suspend the lead in the slurry as it is pumped up to device 10 from the lake bottom or other source. Generally, it is believed that a water velocity of about eleven (11) feet per second or more is sufficient to entrain lead pellets in the pipe 62.

Any suitable means of obtaining the lake bottom or other slurry material for processing in device 10 can be used.

Lead shot is separated from the slurry S by the following process utilizing device 10. As slurry S flows through sluice box 12 toward outlet end 16, slurry S passes over riffle bed 27. At the same time, relatively clean water is continuously introduced into collection pit 30 below riffle bed 27 through clean water supply line 40. The water supplied by line 40 is typically drawn from a fresh water source, such as from a lake through collection pit clean water suction line 68 by collection pit clean water pump 70 (see FIG. 3). The water introduced into pit 30 is balanced with the water exiting discharge port 32 so that there is a limited net flow through the riffle bed, which can be zero or a slight downward flow and preferably a net upward flow of water out of collection pit 30 and through riffle bed 27 into sluice box 12. This limited flow and preferably a slight upward flow of water through riffle bed 27 causes eddy currents in the region of riffles 28 and a "false" or apparent bottom below riffle bed 27. Because most unwanted solid slurry particles are either larger than the openings between riffles 28 of riffle bed 27 or of a substantially lower specific gravity than the lead shot, the bulk of the unwanted solid portion of slurry S passes over the "false bottom" created by the flow of water relative to riffle bed 27 and passes out outlet end 16 of sluice box 12 and back into the lake from which it was originally dredged or other location as desired.

Where the feed slurry contains lead shot, the material collected in collection pit 30 typically consists primarily of lead shot and with a relatively small amount of undesired solid material. This mixture is continuously drawn from pit 30 through discharge port 32 and collection pit effluent line 34 by collection pit discharge pump 74. Pump 74 discharges the material from pit 30 into secondary separator 42 through secondary separator influent pipe 78 for further separation.

The operation of secondary separator 42 is best discussed in conjunction with FIG. 2. Collection pit effluent passes from effluent line 34 through secondary separator influent pipe 78, which is generally coaxially located within separator 42. At the same time, clean water enters separator 42 through clean water supply line 44 and passes upward around the outside surface of influent pipe 78. The upward flows of clean water and collection pit effluent mix in the region above the top of pipe 78, causing the generally lighter undesired solid material to be carried up and out through secondary separator effluent line 46 while the heavier lead shot P settles downward around the outside of pipe 78 and out lead shot discharge port 48. The lead shot and water leaving port 48 typically will be directed into a barrel B or other receiving receptacle. The barrel is then dewatered and the recovered shot reproducessed or used as desired. Secondary separator effluent is returned to sluice box 12 upstream of riffle bed 27 by secondary separator effluent line 46.

The collection of material from slurry S into collection pit 30 is believed to be dependent on the physical dimensions and orientation of riffles 28 and the flow rates of feed slurry and amount of water flowing upwardly through riffle bed 27. In the preferred embodiment, sluice box 12 is about 30 inches wide and open bottom portion 26 of sluice box 12 is approximately thirty inches square. Preferably, sluice box 12 is longitudinally oriented at an angle of about 5-10 degrees from horizontal, with the inlet end higher than discharge end. The angle of inclination can be adjusted as desired. Increasing the angle increases the velocity of the slurry across riffle bed 27, which changes the collection characteristics of device 10. Faster flow increases the amount of slurry that can be processed and generally results in less collection of solids. Collection pit 30 is about 30 inches deep at its deepest point. Riffle bed 27 is located within this opening and consists of approximately 26 riffles constructed from thirty inch lengths of one inch galvanized angle iron. As shown in FIG. 5, riffles 28 are adjustably mounted in open portion 26 by riffle mounting bolts 80. Bolts 80 pass through apertures in the side of sluice box 12 (not shown) and into threaded riffle members 82, which can be threaded nuts welded or otherwise securely attached to riffles 28, located at the ends of riffles 28. The cooperative action of bolts 80 and members 82 permits the radial orientation of riffles 28 to be adjusted by loosening bolts 80, turning riffles 28 and retightening bolts 80 as shown in FIG. 6. This permits the gap between riffles 28 to be adjusted between to a minimum gap dimension Y and a maximum gap dimension X, also shown in FIG. 6. For collection of lead shot, in the preferred embodiment, riffles 28 are spaced about 1.25 inches apart (the center to center horizontal distance between members 82). The radial orientation of adjacent riffles 28 typically is adjusted so that the gap between adjacent top edges of riffles 28 is typically between about ⅛ and 3/16 inches. The spacing between the riffles depends on the slurry characteristics. For slurries with relatively large solid particles (e.g., larger than 0.1875 inches) the riffles are adjusted to an 0.1875 inch gap and for slurries with a large amount of small particles (e.g., less than 0.1875 inches) the gap is adjusted to less than 0.1875 inches down to a minimum of about 0.125 inches. The collection characteristics of riffles 28 change as the riffles 28 are rotated. For example, as riffles 28 are rotated in counterclockwise direction in FIG. 6, (from a horizontal riffle position shown in solid lines to a relatively vertical position shown in dotted lines) the top edge 28a of riffles 28 is more upright and tends to create a greater area of eddy currents, thereby resulting in the collection of more solid material.

The separation of lead shot from slurry S is also effected by the collection pit clean water flow, the slurry flow rate through sluice box 12, and the dimensions of the supply and effluent lines 40 and 34. In the preferred embodiment, dredge 54 provides about 1800-3000 gallons per minute of slurry into sluice box 12. This results in a slurry level of about 10 to 12 inches above riffles 28. At the same time, preferably, collection pit clean water pump 70 introduces about 300 gallons per minute of clean water into collection pit 30 while collection pit effluent pump 74 removes about 180 gallons per minute of effluent from collection pit 30 through 2-inch effluent line 34. This results in a net positive flow into pit 30 which results in the net upward fluid flow out of riffle bed 27 of about 130 gallons per minute and helps to create the eddy currents that facilitate the separation of the lead shot from the slurry S as well as providing a self-cleaning riffle bed, since large solid particles will be less likely to clog riffle bed 27 because of the upward fluid flow through riffle bed 27. Significant relative deviations from these flow rates are undesirable as too great a net upward flow out of pit 30 will prevent some lead shot from settling into pit 30 while too great a net downward flow into pit 30 will allow too much undesired solid material to fall through riffle bed 27 and can clog riffles 28 depending on the size of the solids in the feed slurry. Preferably, device 10 is operated in a manner such that there is a slight upflow about 130 gallons per minute (about 20 gal./ft.$^2$-min.), up through riffle bed 27. When the system is properly adjusted for a typical high content lead shot slurry, the typical collection pit bottoms effluent (180 gallons per minute) is about 99 percent water and about 0.65 percent solids on a volume basis, with about 95 percent of the solids being the lead shot or about 100 pounds of lead shot per minute.

Additionally, it is preferred that collection pit clean water supply line 40 introduce clean water into opposing sides of pit 30 at equal flow rates. These equal flow rates are accomplished by using a single pump 70 feeding the 3 inch T-shaped supply line 40 shown in FIG. 4. The opposed clean water inlet flows help to direct lead shot toward the center of pit 30 while at the same time combining to yield the generally upward flow required across riffles 28.

Certain flow rates and secondary separator dimensions have also been found to improve the operation of secondary separator 42. Secondary separator 42 is found to work well when it is about 7 feet in height with secondary separator influent member 78 extending about 10 to 12 inches above the bottom end of separator 42. In the preferred embodiment, clean water is supplied to separator 42 at about 250 gallons per minute, while the collection pit effluent is introduced at about 180 gallons per minute. Lead shot separation appears to be optimized at these flow rates. The continued impact of lead shot on the impeller of discharge pump 74 causes the flow rate from pump 74 to diminish as impeller wear increases. In order to compensate for this reduced collection pit effluent flow, a 300 gallon per minute or greater pump can be used for pump 70 and its output adjusted with a control valve (not shown). As collection pit effluent flow decreases, clean water input to separator 42 can be increased by opening the control valve from an initial partially closed position of about 15 degrees so that the total flow needed for optimum operation of separator 42 is maintained. Pumps suitable for use as clean water pumps 50 and 70 are available from the Teel Co., Model 3P712 rated at 20,800 gallons per hour at a 10 foot head. A pump suitable for effluent pump 74 is the Granger-Teel Model 2P333 rated at 10,800 gallons per hour at a 10 foot head.

While the invention has been described in connection with a preferred lead shot reclamation embodiment, the invention is susceptible to numerous changes and rearrangements. Therefore, the scope of the invention should be limited only by the following claims.

What is claimed is:

1. A device for reclaiming high specific gravity solid pellets from a slurry of feed material containing the pellets and other solids having a lower specific gravity than the pellets, comprising:
    a sluice box for permitting slurry flow therethrough and having a sluice inlet and a sluice outlet for the slurry;
    an open-bottom riffle bed comprising a plurality of spaced apart riffles and located in a bottom portion of said sluice box between the sluice inlet and the sluices outlet, said riffles being generally horizontally disposed and extended lengthwise generally perpendicular to the flow of feed material;
    a collection pit located beneath the riffle bed and for permitting liquid flow between the collection pit and the sluice box through the riffle bed, for collecting high specific gravity pellets, said pit including a discharge port at a bottom portion of the pit for allowing the pit to be emptied of fluid and high specific gravity pellets while the device is operating;
    a clean water inlet port connected to the collection pit for providing fluid flow into the collection pit below the riffle bed for controlling fluid flow between the collection pit and the sluice box through the riffle bed to provide an apparent bottom for the riffle bed and causing the pellets in combination with the riffle bed to be selectively separated for the other solid materials in the slurry feed materials by passage through the riffle bed and into the collection pit; and 'a secondary separator connected to said discharge ports for separating residual undesired collection solid material from the pellets, said secondary separator including a vertical elongated separator vessel having a secondary clean water inlet port near its lower end and an effluent line near its upper end, a substantially coaxially oriented vessel influent pipe for discharging inlet material upwardly in said separator vessel, said influent pipe having one end connected to said discharge port and a second end terminating above said clean water inlet port and below said effluent line, and a secondary vessel below said clean water inlet of the separator vessel below said clean water inlet port and said influent pipe second end for discharging high specific gravity pellets from the separator vessel.

2. The device of claim 1 wherein said effluent line discharges into the sluice box upstream of the riffle bed.

3. The device of claim 1 further comprising a barge for transporting said device around a body of water so that lead shot can be continuously recovered from different portions of the bottom of the body of water.

4. The device of claim 3 further comprising a dredge for removing material from the bottom of a body of water and means for introducing the material as a water slurry into the sluice box inlet.

5. The device according to claim 1 wherein said vertical elongated separator is approximately seven feet long.

6. The device according to claim 5 wherein said vessel influent pipe terminates approximately eleven inches above said lower end of said separator vessel.

7. The device according to claim 6 wherein said secondary clean water inlet port supplies water at a rate of approximately 250 gallons per minute.

8. A device for reclaiming high specific gravity solid pellets from a slurry of feed material containing the pellets and other solids having a lower specific gravity than the pellets, comprising:
    a sluice box for permitting slurry flow therethorugh and having a sluice inlet and a sluice outlet for the slurry,
    an open-bottom riffle bed of a plurality of spaced apart riffles and located in a bottom portion of said sluice box between the sluice inlet and the sluice outlet, said riffles being generally horizontally disposed and extending lengthwise generally perpendicular to the flow of feed material, wherein each of said riffles comprises two elongated flanges extending from a common longitudinal edge to define an L-shaped cross-section, each said riffle being mounted to said sluice box for rotational adjustment about said longitudinal edge;
    a collection pit located beneath the riffle bed and for permitting liquid flow between the collection pit and the sluice box through the riffle bed, for collecting high specific gravity pellets, said pit including a discharge port at a bottom portion of the pit for allowing the pit to be emptied of fluid and high specific gravity pellets while the device is in operation, said collection pit including a pair of downwardly conveying walls;
    a clean water inlet port connected to the collection pit for providing fluid flow into the collection pit below the riffle bed for controlling fluid flow between the collection pit and the sluice box through the riffle bed to provide an apparent bottom for the riffle bed and causing the pellets in combination with the riffle bed to be selectively separated form the other solid materials in the slurry feed materials by passage through the riffle bed and into the collecting pit; and
    a secondary separator connected to said discharge ports for separating residual undesired collected solid material from the pellets, said secondary separator including a vertical elongated separator vessel having a secondary clean water inlet port near its lower end and an effluent line near its upper end; a substantially coaxially oriented vessel influent pipe for discharging inlet material upwardly in said separator vessel, said influent pipe having one end connected to said discharge port and a second end terminating within said clean water inlet port and below said effluent line; and a secondary discharge port located in a bottom wall of the separator vessel below said clean water inlet port and said influent pipe second end for discharging high specific gravity pellets from the separator vessel.

* * * * *